INVENTOR.
HERBERT R. AXELROD

United States Patent Office 3,361,114
Patented Jan. 2, 1968

3,361,114
METHOD FOR FEEDING FISH AND OTHER AQUATIC ANIMALS
Herbert R. Axelrod, Deal, N.J., assignor to T.F.H. Publications, Inc., Jersey City, N.J., a corporation of New York
Original application Dec. 2, 1966, Ser. No. 598,847. Divided and this application June 14, 1967, Ser. No. 646,038
10 Claims. (Cl. 119—3)

ABSTRACT OF THE DISCLOSURE

A new method and articles for feeding aquatic animals are described. The new method comprises adhering a unitary mass of food, capable of being torn apart by feeding fish, reptiles or Amphibia, to a surface accessible to the feeding animals, maintaining the uneaten portion of the adhered food in a unitary mass while the fish, reptiles or Amphibia are actively feeding thereon, and thereafter removing the remaining uneaten food from the surface to prevent fouling of the water in the aqueous environment.

Cross reference to a related application

This application is a divisional application of my copending parent United States patent application Ser. No. 598,847, filed Dec. 2, 1966 for Freeze Dried Food Article For Aquatic Aminals.

BACKGROUND OF THE INVENTION

Field of the invention

The present invention relates to a novel method of feeding aquatic animals, including fish, reptiles and Amphibia. For convenience the invention will be described hereinafter primarily with reference to fish, but it is to be understood that wherever the term "fish" is employed, unless the context specifically dictates otherwise, it is intended to encompass all aquatic animals, including those which are strictly aquatic such as fish, and those which spend at least part of their life out of water such as the reptiles and Amphibia. More particularly, the invention relates to the method of feeding aquatic animals by providing a unified mass of food adhered to a surface so as to be accessible to the fish, reptiles or Amphibit, to be fed.

Description of the prior art

In recent years, due to increasingly widespread interest in keeping and breeding aquatic animals in the home and elsewhere, much work has been done on the development of general and special purpose prepared foods, particularly for tropical and other small fish suitable for aquarium culture. Previously available prepared fish foods have taken the form of dry granular, pelletized, or flake materials for the most part, although a number of frozen foods have also been available. Natural fresh or live fish foods, such as daphnia, brine shrimp and tubifex and other small worms are also available commercially. Of the previously available prepared foods, those which have been found readily acceptable by fish, have in greater or lesser degree suffered from the disadvantage of being awkward to handle and, in particular, of being difficult to divide into accurate portions. This has been a serious drawback, particularly on occasions when fish must be fed by inexperienced persons, since any excess food not eaten by the fish within a short time after feeding will decay and foul the water in the tank, or other aquatic environment, often causing it to become malodorous, cloudy and discolored. This is not only distressing to the viewer but is unhealthy for the fish due to the reduction in the available oxygen content and to the increase in waste gasses accumulated in the aquarium water.

The tendency to foul water in an aquatic environment is particularly acute with dry particulate prepared foods, even those which float on the surface of the water for a time, since such foods tend to disperse quickly over the surface of the water, and eventually sink and become dispersed throughout the aquarium or other aquatic environment, thus making recovery of uneaten food virtually impossible. Available frozen fish foods, such as frozen daphnia, gammarus, brine shrimp, tubifex worms, and other small aquatic organisms are more easily portioned than dry particulate foods and thus the likelihood of over feeding is lessened somewhat, but even these materials are slippery and difficult to handle or divide when frozen, and when introduced to the tank, quickly thaw and disintegrate into small particles which become completely dispersed in the aquarium and, if uneaten, foul the water. Fresh and live natural foods such as ground liver, and live daphnia, brine shrimp and tubifex worms, for example, while highly desired by the fish are also difficult to portion and to keep fresh between feedings.

Heretofore, the soundest approach to the problem of feeding fish without fouling the water with excess uneaten food has been to provide foods which float and can, therefore, be recovered from the surface of the water. It has been suggested, for example, that floating fish food pellets be made by mixing a plurality of finely screened meals and mechanically forming the mixture into hollow pellets. Another floating fish food previously suggested is prepared by grinding the food ingredients to granular form, mixing the ingredients with a binder, forming a thick aqueous slurry, and heating the slurry between hot platens to form a sheet material which can be broken into flakes which float due to the low specific gravity of the product. Although a floating fish food can be recovered, in practice it has been found that particulate foods of this type become widely scattered over the surface of the water, thus necessitating skimming the entire surface for recovery. Moreover, as noted above, previously available particulate fish foods which float for a time, tend to become saturated with water, sink and become dispersed throughout the aquarium before being recovered from the surface.

The prior art is also replete with various devices, generally intended to float on the surface of the water, which confine or disperse particulate food. For example, floating and fixed feeding rings have been used to confine particulate flake or granular fish food to the area of the surface of the water surrounded by the feeding ring. Such rings do not solve the problem of accurate portioning of particulare food, however, and also fail to prevent dispersion of such food throughout the aquarium after it becomes wet and sinks below the confines of the ring. Floating containers having bottom walls provided with a plurality of perforations have also been used to feed live worms to fish, the worms being placed in the container and allowed to pass through the holes in the bottom to become accessible to the feeding fish. Such feeding devices also fail to aid in portioning tangled gobs of live worms and provide such slow access to the worms that the aquarist is deprived of the pleasure of watching actively feeding fish.

Brief summary of the invention

It has long been apparent, therefore, that a need has existed in the art for a convenient, fool-proof method for feeding the fish or other aquatic animals in an aquarium or other relatively limited aquatic environment, which would provide sufficient food for a single periodic feeding of the fish or other animals without, however, introducing excess food which would decay and tend to foul foul the aquatic environment. This long-felt need in the art has now been met by the method of the present invention, which is based upon the novel concept of feeding fish or other aquatic animals by providing a unified mass of fish food, capable of being torn apart by feeding fish, reptiles, Amphibit or other aquatic animals, adhered to a suitable surface positioned so that the adhered mass of food is accessible to the feeding animals. In this way fish are enabled to feed from the mass of fish food by tearing off and consuming small pieces until the mass of food is substantially completely consumed. Inasmuch as the bulk of the food separated from the mass is normally immediately consumed, dispersion of food particles is greatly inhibited, thus preventing fouling of the water by decay of uneaten dispersed food particles. In the rare instance when the unified mass of food, or any portion thereof, becomes separated from the surface to which it is adhered and is not immediately consumed by feeding fish, due to the persistent bouyancy of the food articles used in the present invention, the separated portion will float to the surface of the water and remain there so that it can be removed before it sinks or decays.

*Detailed description of the preferred embodiments*

Figure 1:
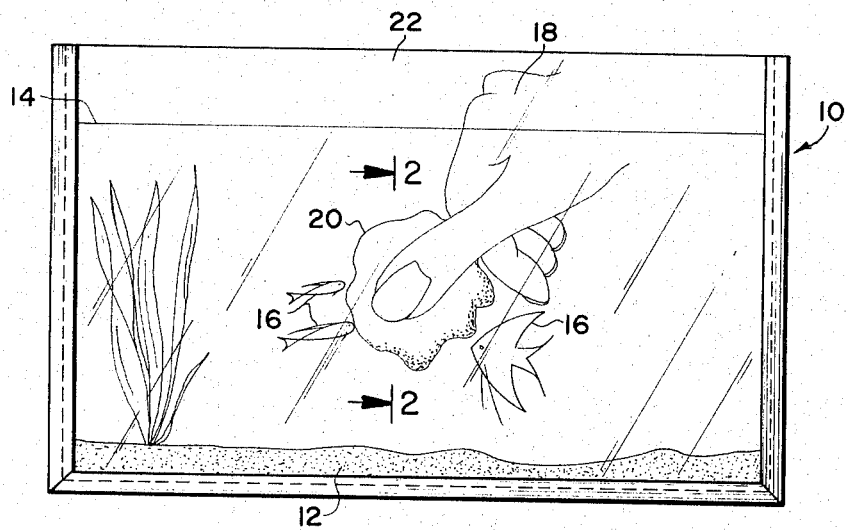
FIG. 1 is a side elevational view of an aquarium showing a unified mass of fish food being manually pressed against the rear inner wall according to the method of the invention.

Referring now to the drawing, in which like reference numerals designate like parts, there is shown a conventional aquarium consisting of a tank 10 having four glass side walls and a slate bottom cemented in watertight engagement with a steel frame. The tank 10, which is open at the top, contains gravel 12, water 14, water plants, if desired, and a plurality of fish 16. A unified mass of fish food 20 consisting of freeze-dried tubifex worms, prepared as described in my application Ser. No. 598,847 referred to above, is shown in FIG. 1 being pressed against the inner surface of the rear glass wall 22 of the tank, beneath the surface of the water 14 by the thumb of a human hand 18. The unified mass of fish food 20, when dry, is generally rectangular in shape, but as can be seen in FIG. 1, when immersed in water and pressed against a suitable surface becomes deformed into an amorphous, but still unified mass.

Figure 2:
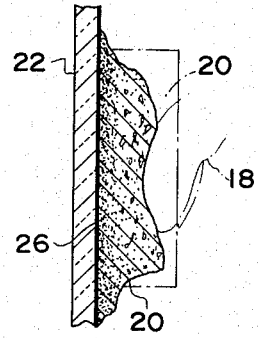
FIG. 2 is a cross sectional view taken on the line 2—2 of FIG. 1, and drawn on an enlarged scale, showing a wet unified mass of fish food adhered to a surface with a layer of adhesive substance therebetween.

The new fish food articles described in my application Ser. No. 598,847 referred to above, prepared from tubifex worms, brine shrimp or other natural food substances, contain a substance derived from the tubifex worms and brine shrimp, for example, which, although non-tacky when dry, becomes adhesive in the presence of moisture. It has been observed that this water-activatable adhesive substance tends to be expressed from such fish food articles when they are pressed against a surface in the presence of moisture. This may be seen in FIG. 2, a cross section taken on the line 2—2 of FIG. 1, which shows a layer of the water-activatable adhesive 26 which has been expressed from the wet tubifex fish food article 20 by manual pressure of the human thumb to form an adhesive layer between the deformed fish food article and the glass wall 22.

Other manufactured fish food articles, such as the brine shrimp articles having a layer of added adhesive on at least one surface thereof, which are described in my application Ser. No. 598,847 are also useful in this invention. The added adhesive on such articles may be additional adhesive material derived from the raw material from which the food article is made, i.e. tubifex or other worms, brine shrimp, or mammallian meat or it may be any other suitable water-activatable adhesive or any suitable pressure sensitive adhesive such as the rubber base materials used in surgical adhesive tape.

The method of the invention may be carried out in various ways the essential consideration being that the fish food be fed to the fish in the form of a unified mass of food which, under the conditions and duration of use, does not disintegrate spontaneously, but which is sufficiently loosely held together so that portions may be separated by the tugging feeding action of the fish. In order to maintain control of the mass of food employed in the new method it is adhered to a suitable surface which is or can be made accessible to the feeding fish. The surface to which the unified mass of food is adhered may be an existing surface submerged in or defining the aquarium or other environment containing the fish. For example, the surface may be one of the glass, slate, metal or plastic side walls of the aquarium, or a surface of a filter, aerator, heater, thermometer, toy, rock or other decorative or functional object in the aquarium. Similarly any suitable surface in an outdoor pool, pond, stream or other body of water may be utilized to anchor the unified mass of fish food. Further, although the surface to which the fish food is adhered is generally submerged in or is in contact with the water, this is not always necessary, since the surface may be adjacent to but not in contact with the water as long as the adhered mass of fish food is in contact with the water or so close thereto that the fish have access to the food. For example, the food may be adhered to the lower surface of an object suspended above the water or floating on the water, if desired. Obviously, the food need not be immersed in the water in the case of reptiles or Amphibia, such as turtles, for example.

In carrying out the method of the invention the unified mass of fish food may be adhered to a surface of the type referred to above by any suitable means including, but not limited to, naturally occurring or added adhesive means of any suitable type such as dry, water-activatable animal adhesive substances, common animal glue, or other synthetic or natural pressure sensitive adhesives. In the broadest aspect of the method, any unified mass of food acceptable to fish and capable of being torn apart and eaten by fish, when made accessible to them, is adhered by any suitable means to any surface accessible to or which can be made accessible to the fish to be fed.

Manufactured or prepared unified masses of fish food useful in the invention have the capability of adhering directly to wet glass or other surfaces. Certain suitable unified masses of fish food contain dry natural substances derived from the fish food itself and present therein after preparation, by freeze-drying, for example, and which are activatable in the presence of moisture to provide the capability of the masses to adhere to a surface when pressed thereagainst. Other unified masses of fish food useful in the invention contain added adhesive materials either within the body of the mass or coated on at least one surface thereof to provide for adhesion of the masses to surfaces in the presence of moisture, or to supplement the inherent capability of the masses for such adhesion.

The preferred unified masses of fish food for use in the invention are those containing no added adhesive but which are sufficiently adherent in the presence of moisture for the purposes of the invention. Among such suitable unified masses of fish food are dessicated materials derived by freeze drying certain fleshy foods of animal origin; more specifically, mammallian meat, including muscle tissue, heart and liver and mixtures thereof, brine shrimp, and tubifex or other small worms, including earth worms, and mixtures of these foods. The preparation of such unified masses of fish food is described in detail in my patent application Ser. No. 598,847, but in general, comprises initial cleaning or other preparation of the fresh, raw fish food including the blending of any supplementary ingredients, filling of the food into shallow pans or otherwise forming it into a relatively thin layer, quickly freezing the food and dessicating the frozen material under vacuum according to techniques known per se in the freeze-drying art. The freeze-dried material may then be sterilized, if desired, to kill any harmful bacterial or ova of parasites that may be present. The resulting product is a dessicated sheet of fish food having a moisture content of about 5% by weight or less, which can be cut into pieces of any desired size, providing suitable portions for a single feeding.

*Example I*

A freeze-dried unified mass of fish food which will adhere to a wetted surface such as glass without added adhesive is prepared as follows: Living tubificid worms (*Tubifex* sp.), which are commonly known as aquarists as tubifex worms, are collected in their native habitat. As is well known, such worms are found in rivers throughout the world, existing in large colonies in mud immediately adjacent to areas rich in sewage. Such worms are an excellent source of protein, are avidly devoured by fish, and are of such small size that they may be eaten by all but very small young fish. The live tubifex worms are placed in clean running water for a period of about 72 hours at the end of which time the worms have emptied their digestive tracts. Although the worms can be freeze-dried immediately upon collection, they usually contain undesirably large amounts of foreign matter which is preferably removed. The living worms are then placed in suitable shallow containers such as pans about 3 feet square. The pans are then placed in a conventional low temperature freezer and quick frozen by subjecting them to a temperature of 0° F. for about 2 hours. The pans of quick frozen worms are then placed in a conventional vacuum dryer and subjected to a temperature of about −25° C. and a vacuum of about 0.1 to 0.5 mm. of Hg pressure. While in the vacuum dryer the frozen worms are subjected to ultraviolet radiation to sterilize the worms and kill any harmful bacteria which the worms might be carrying in order to prevent growth of these harmful organisms in the aquarium or other environment to which the fish food is ultimately introduced. The vacuum drying of the frozen worms is continued until a dessicated sheet of intertwined worms containing about 5% by weight or less moisture is obtained.

The depth of live worms loaded into the pans is such as to produce a dried sheet about 1/8" to 1" or preferably about 1/4" to 1/2" in thickness. Thinner or thicker sheets may be produced if desired but sheets thinner than 1/4 inch, especially below 1/8 or 3/16 inch in thickness tend to have poor mechanical strength and are, therefore, more difficult to handle and portion without waste. Sheets more than 1/2 inch thick may be prepared but it is seldom necessary to do so since sheets of 1/4 to 1/2 inch in thickness generally provide a sufficiently large portion of worms for a single feeding for aquarium purposes, when cut into pieces of about 1/2 to 2 square inches in area. After cutting the dessicated sheet of worms into portions of desired sizes, these portions are placed in plastic containers and subjected to treatment with either nitrogen or carbon dioxide at about 50 p.s.i.g. at room temperature. In order to kill Salmonella which may infest the fish food it is desirable to subject the material to 80° C. heat for about 30 minutes.

The resulting chips or pieces of dessicated tubifex worms are then placed in plastic bottles with screw caps for shipment and storage until used. Packaging of this or a similar type, which limits access of moisture to the fish food, is desirable, since freeze-dried fish food is normally hygroscopic.

The chips produced in this way when immersed in water in an aquarium and pressed against the wet inner surface of one of its glass sides, will adhere to the glass sufficient tightly to remain in place while the fish in the aquarium voraciously attack the chip, tugging at and removing morsels therefrom. The pressure required to cause adhesion of such chips of dessicated fish food is only light to moderate manual or digital pressure.

The above and other fish food articles useful in the method of the present invention are described in my copending U.S. patent application Ser. No. 598,847, filed Dec. 2, 1966.

While not wishing to be bound by any theory, it is presently believed that the freeze dried fish food articles of the invention described in my application Ser. No. 598,847 which are found to adhere to suitable surfaces in the presence of moisture, in the absence of added adhesive, do so primarily because they contain adhesives derived from the animal food material itself. These adhesives, although dry and non-tacky in the dry freeze-dried product, are apparently hydrated in the presence of moisture to become tacky and capable of temporarily bonding the food article to a suitable surface. These dry adhesive materials which become tacky in the presence of moisture, are believed to be derived from degraded protein, and apparently comprise substances such as gelatin derived from muscle collagen, uncoagulated blood protein, and meucopolysaccharide, and meucoproteinate or similar materials and mixtures thereof. The variation in the inherent adhesive qualities of the freeze-dried fish food articles derived from different raw materials, such as tubifex worms and brine shrimp, for example, is believed to be due to the variation in the type and amount of degraded proteinaceous substances present.

In order to improve the adhesive qualities of freeze-dried fish food articles which are not inherently strongly adhesive, degraded proteinaceous materials extracted from the same or different food materials may be incorporated in the raw or fresh food prior to freeze-drying or may be applied as an external coating after freeze-drying, as described in my application Ser. No. 598,847. The degraded proteinaceous adhesive substances may be extracted from mammallian meat, tubifex worms or other animal substances rich in such materials by any suitable technique. For instance, a mass of macerated tubifex worms may be suspended in a mild aqueous carbonate solution (1 to 10% by weight) and centrifuged to remove the solid matter and collect the liquor rich in the desired natural adhesive materials. This liquid may then be blended with fresh food, such as live brine shrimp, for example, in order to enrich it in the natural adhesives prior to freeze-drying to produce an adherent fish food article containing the added adhesive. Other known adhesive materials can be used in the same way to improve the adhesive properties of the new fish food article. Such adhesive materials include available adhesives based upon casein or other uncoagulated animal substances such as albumin, globulin, gelatin, blood serum or the like, or carbohydrates such as starch, dextrin, gum arabic and the like, or mixtures of these substances. Any of the adhesive materials recited above may also be coated on the surface of an article after freeze-drying in order to render it adhesive in the presence of moisture. Conventional blending and coating techniques and apparatus may be used to incorporate the recited adhesives in the body or on the surface of the new fish food articles as desired.

The bond produced by adhesive substances which are found in the freeze-dried articles, described in my application Ser. No. 498,847, derived from mammallian meat, tubiflex worms, earth worms and brine shrimp, for example, is transient, in an aqueous environment, but is sufficiently enduring for purposes of the present invention. This is probably due to the fact that when such fish food articles are pressed against a suitable surface under water, there is sufficient water available to not only hydrate and activate the adhesive, but to eventually solubilize it and destroy the bond. It should be noted that if the freeze-dried food has a closed cell structure, a slight vacuum may be created when it is pressed against the surface, thus aiding adhesion by virtue of the osmotic pressure of the surrounding water. Any air pockets within the food article would aid in this pressure phenomenon. This is the case with the articles described in my application Ser. No. 498,847 which, although closely packed, are light in weight and compressible, especially when wet. The freeze-dried tubiflex worm product prepared according to Example I, for instance, is readily compressible when wet to about 50% of its dry volume by digital pressure against a surface to which it is to be adhered. It should also be noted that such freeze-dried products, which are derived from mammallian meat, tubifex and other worms, and brine shrimp, and which are found to be inherently adherent when pressed against a surface in the presence of moisture, are all characterized by a porous, fibrous structure containing voids permitting compression. Similar products prepared by freeze-drying ocean shrimp or small hard shelled organisms such as daphnia or meal worms, which are not fibrous in nature, are not operative in the present invention without added adhesive, because they are not inherently adherent when pressed against a surface in the presence of moisture.

It is preferred that fish food used in the method of the present invention have the ability to float for a period of at least about 48 hours in the event that the unified mass should become detached from a surface to which it has been adhered. For this reason, whether the mass of fish food remains attached to the aquarium wall or other surface, or becomes detached and floats on the surface of the water, it can be observed whether or not it has been completely consumed before introducing additional food to the aquarium, thus obviating over feeding and fouling of the water in the aquarium.

Suitable portions of three-dimensional freeze-dried fish food articles for single feedings in aquariums of most sizes are generally about ¼ to ½ inch thick and ½ to 2 inches in length and width. Chips or unified masses of this size composed of the freeze-dried fish foods prepared according to my application Ser. No. 598,847 are found to have sufficient surface area to adhere sufficiently strongly to wet glass or any other suitable surface when pressed thereagainst to resist being dislodged by feeding fish.

It has been found that the method of the present invention for the first time permits the feeding of fish to be entrusted to unskilled operators or those unfamiliar with the problems attendant to feeding fish by prior methods, without endangering the health of the fish or detracting from the aesthetic enjoyment of an aquarium due to fouling of the water by uneaten decayed food.

Another advantage of the new method is that the unified mass of adherent fish food may be adhered to a surface at any desired level in an aquarium, for example, thus affording an opportunity for fish of various species to feed near the surface, bottom or at intermediate levels of the aquarium according to their natural habits.

The foregoing illustrates the practice of this invention, which, however, is not to be limited thereby, but is to be construed as broadly as permissible in view of the prior art and limited by the scope of the appended claims.

What is claimed is:

1. A method of feeding live aquatic animals present in an environment containing water which comprises the steps of pressing a unified mass of prepared fish food against a surface accessible to said aquatic animals thus attaching said mass of food to said surface by attractive forces created therebetween by pressing the former against the latter, permitting feeding aquatic animals to detach morsels of food from said unified mass as they feed thereon, and maintaining uneaten food in said unified mass in attachment with said surface, thus inhibiting dispersal of uneaten food particles in said water and consequent fouling thereof.

2. A method according to claim 1, wherein uneaten food is removed from the aqueous environment after said aquatic animals cease active feeding thereon.

3. A method according to claim 1, wherein adhesive material present in said unified mass of prepared fish food is expressed therefrom as said mass is pressed against said surface, thus providing said attractive forces.

4. A method according to claim 3, wherein said adhesive material occurs naturally in said unified mass of prepared fish food.

5. A method according to claim 3, wherein said adhesive material comprises an added adhesive substance incorporated in said unified mass of prepared fish food.

6. A method according to claim 1, wherein said unified mass of prepared fish food is provided with an external coating of pressure sensitive adhesive.

7. A method according to claim 1, wherein said unified mass of prepared fish food comprises freeze-dried animal matter, selected from the group consisting of tubifex worms, earth worms, brine shrimp, mammallian meat and mixtures thereof.

8. A method according to claim 7, wherein the unified mass of prepared fish food is of a size suitable for a single feeding of fish in an aquarium, and consists essentially of freeze-dried tubifex worms, said mass being porous and when moistened, being adherent to a surface when pressed thereagainst.

9. A method according to claim 7, wherein the unified mass of prepared fish food is of a size suitable for a single feeding of fish in an aquarium, and consists essentially of freeze-dried brine shrimp, said mass being porous and when moistened, being adherent to a surface when pressed thereagainst.

10. A method according to claim 7, wherein the unified mass of prepared fish food is of a size suitable for a single feeding of fish in an aquarium, and consists essentially of freeze-dried fresh finely divided mammallian meat selected from the group consisting of muscle tissue, liver, heart and mixtures thereof, said mass being porous and when moistened, being adherent to a surface when pressed thereagainst.

References Cited

UNITED STATES PATENTS

| | | | |
|---|---|---|---|
| 1,976,962 | 10/1934 | Pape | 119—3 X |
| 2,849,981 | 9/1958 | Rose et al. | 119—1 |
| 2,867,055 | 1/1959 | Lebiedzinski | 119—1 X |
| 2,968,280 | 1/1961 | Gutstein | 119—5 |
| 2,984,208 | 5/1961 | Kopietz | 119—51 |
| 3,095,852 | 7/1963 | Goldman | 119—3 |
| 3,260,238 | 7/1966 | Holden | 119—5 |
| 3,279,430 | 10/1966 | Mugridge | 119—3 |
| 3,304,653 | 2/1967 | Zadarnowski | 119—5 |
| 3,314,396 | 4/1967 | Willinger | 119—5 |

ALDRICH F. MEDBERY, *Primary Examiner.*